2,807,596

COMMINUTED PARTICLES OF A COMPOSITION CONTAINING A RUBBER, BITUMEN, AND BLOWING AGENT, AND METHOD OF USING SAME IN BUILDING ROADS

John A. Flickinger, Bethany, Conn., assignor to United States Rubber Company, New York, N. Y., a corporation of New Jersey No Drawing. Application April 27, 1954,
Serial No. 426,036

20 Claims. (Cl. 260—28.5)

This invention relates to improvements in comminuted particles of thermoplastic compositions containing rubber for incorporation in the bituminous binders used in building roads.

In conventional road building practice, hot bituminous binder (asphalt or road tar) is mixed with the aggregate at a pug mill and the mix is then transported to the paving site, or the dry aggregate is first laid on the road and the hot binder is then sprayed on the aggregate. In these operations the binder is at a temperature of 250° F. to 400° F. (generally 250° F. to 350° F.). The asphalt binders used are graded according to penetration values at 77° F. as measured by the standard method of test for penetration of bituminous materials (A. S. T. M. D5–52), the penetration values being measured as the tenths of a millimeter that a tapered standard needle (0.14 to 0.16 mm. tip diameter) will penetrate the asphalt in five seconds with a 100 gram load. The overall penetration range for the various asphalt binders used is from 40 to 300. The ranges 40–70 are generally for asphalt for hot climates, 70–110 generally for temperature climates, and 110–300 generally for cold climates. The road tar binders used are graded according to the standard method of float test for bituminous materials (A. S. T. M. D139–49), wherein a cup having a plug made of the tar under test is floated in a bath of water at 50° C. The water melts the plug, filling the cup and the time in seconds is recorded for the cup to sink. The road tars used as binders are designated from RT 6 to RT12, and have an overall float test range from 20 seconds to 220 seconds. The float test ranges of the various road tars used are about 20–27 seconds for RT 6, 27–42 seconds for RT 7, 42–54 seconds for RT8, 54–75 seconds for RT 9, 75–100 seconds for RT 10, 100–150 seconds for RT 11, and 150–220 seconds for RT 12.

Comminuted rubber particles, such as ground or pelletized rubber, or powdered rubber prepared directly from rubber latex by spray drying, or rubber crumbs prepared by flocculation of rubber latex, have been incorporated in the hot bituminous binder (asphalt or road tar) used with the mineral aggregate in forming paving compositions. However, the rubber particles are uniformly dissolved or dispersed in the asphalt or road tar only with great difficulty.

By the present invention, there is provided an improved form of rubber-containing particles which are free-flowing and non-sintering under storage conditions and which are readily and uniformly dissolved or dispersed in the hot bituminous binder.

According to the present invention, the rubber is blended with a high melting bituminous material to form a composition which is easily miscible with the hot binder and which carries the rubber into solution or dispersion in the binder. The composition can also be readily comminuted into discrete non-adhering particles. The composition also comprises a blowing agent which prevents the comminuted particles or pellets of the composition of the present invention from sinking into the hot bituminous binder and caking when the pellets are mixed with the binder. The blowing agent is decomposed at the temperature of the hot bituminous binder causing the pellets to float and circulate freely through the molten binder, whereby rapid incorporation is provided. Also, when the pellets are added as such to the pug mill with the aggregate and hot binder, the heat of the aggregate and bituminous binder decomposes the blowing agent and the blown pellets disperse in the binder much more rapidly and effectively since the attrition of the aggregate is more effective against the blown pellet.

The composition of the comminuted particles of the present invention comprises 20 to 60 parts of natural or synthetic rubber, 30 to 60 parts of high melting bituminous material having a softening point in the range from 200° F. to 350° F. (sometimes called melting point with high melting bitumens), as measured by the ring and ball test (i. e. the A. S. T. M. test for softening point by the ring and ball apparatus E 28–51T), and 0.01 to 0.5 part of blowing agent, preferably an alkali-metal bicarbonate, either alone or with up to 0.5% of acid material, such as stearic acid or benzoic acid, as is common in blowing rubber compounds for sponge manufacture. There may also be present, if desired, but not necessary, up to 50 parts of powdered inert filler material, such as talc, clay, whiting, mica, silica or alumina, preferably of a fineness to pass a 325 mesh screen. Such high melting bitumens which are conventionally graded and measured by softening points should not be confused with the asphalts and road tars used as the binders as described above, which are measured by penetration and float test values, and which in fact, have softening points below 150° F., i. e. at least 50° F. below such high melting bitumens.

The ingredients of the composition of the present invention may be homogeneously mixed in an internal mixer, such as a Banbury, dumped on a cold mill, sheeted out, cooled, and the blended material comminuted as by passing through a pelletizer.

The high melting bituminous material which has a softening point in the range of 200° F. to 350° F. as measured by the ring and ball test (A. S. T. M. E 28–51T) may be a natural occurring high melting asphalt having a softening point in the range of 200° F. to 350° F., or an asphaltite, such as gilsonite, which has a softening point in such range of 200° F. to 350° F., or it may be a tar or pitch obtained in the pyrogenous treatment of bituminous material having a softening point in such range of 200° F. to 350° F., e. g. coal tar or coal tar pitch (i. e. coke-oven coal tar or pitch, or gas-works coal tar or pitch), water-gas tar or pitch, or oil-gas tar or pitch. It is preferred, but not essential, that where the road binder is asphalt, the high melting bituminous material in the pellets should be a high melting asphalt or gilsonite or mixtures thereof, and where the road binder is a road tar, the high melting bituminous material in the pellets should be a high melting tar or pitch or mixtures thereof.

The rubber may be a natural or synthetic rubber or a reclaim thereof. When using a reclaim, which may contain up to 50% non-rubber material, the rubber content of the composition of the present invention is based on the rubber component of the reclaim. The synthetic rubber may be the product of the emulsion polymerization in the presence of a free radical catalyst of the peroxide or azo type of one or more butadienes-1,3, for example, butadiene - 1,3, 2 - methyl - butadiene - 1,3 (isoprene), 2-chloro-butadiene-1,3 (chloroprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3, hydrocarbons are aryl olefines, such as styrene and vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride. Common commercial synthetic rubbers of this type are GR–S (copolymer of a major proportion of butadiene and a minor proportion of styrene), Paracril (copolymer of a major proportion of butadiene and a minor proportion of acrylonitrile), and neoprene (polymerized chloro-2-butadiene-1,3). The synthetic rubber may also be the product of the polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is Butyl rubber which is a copolymer of about 96 to 99.5 parts of isobutylene and correspondingly 4 parts to 0.5 part of isoprene.

The presently preferred comminuted particles are pelletized in a so-called dicing machine which cuts a 3/16 inch thick sheet of the composition in the shape of cubes about 3/16 inch on each side. Other cube-shaped comminuted particles may be used from 1/32 inch to 1/2 inch on each side. The pellets may have other shapes, such as columnar segments where the composition is extruded through a screen or perforate die and the exudate cut off for the desired length of the pellets with a wire or knife affixed to the extruder head. Preferably, such other shaped pellets will have a volume equal to the volume of a cube from 1/32 inch to 1/2 inch, and will be dusted on the outside surface with the powdered filler.

Generally, the amount of asphalt or road tar binder added to the aggregate in a pug mill is 3% to 15% by weight of the aggregate. The amount of pellets of the present invention which is used may be that amount which gives from 1 to 15 parts of rubber per 100 parts of asphalt or rubber tar binder, whether mixed in the pug mill with the hot aggregate before the binder is added, or mixed with the hot binder before introduction into the pug mill or spraying on the rolled dry aggregate.

The following examples illustrate the invention. All parts and percentages referred to herein are by weight.

*Example I*

Forty parts of Butyl rubber (a copolymer of 96% to 99.5% of isobutylene and 4% to 0.5% of isoprene) were broken down in a Banbury mixer (cooling water was introduced in the jacket to keep the temperature below 200° F.), and forty parts of gilsonite (having a softening point by the ring and ball test of 270° F.–290° F.) and 19.86 parts of a high melting asphalt having a softening point of 300° F. by the ring and ball test were mixed in, followed by 0.07 part of sodium bicarbonate and 0.07 part of stearic acid. The batch was dumped onto a cold mill, sheeted out to about 3/16 inch thickness, cooled, and passed through a pelletizer which was a Cumberland Stairstep Dicer which comminuted the sheet into free-flowing cube-shaped pellets about 3/16 inch on each side.

Into a one-ton pug mill was loaded 1880 pounds of aggregate which was heated to 300° F.–350° F. Fifteen pounds of the pellets of the present invention, prepared as above, were added all at once with churning; and less than a minute later 105 pounds of 85 to 100 penetration asphalt binder (softening point 116° F.) which was heated to 300° F.–325° F. were added, and the mix churned for less than a minute. The mix was transferred to trucks for transport to the paving site where it was dumped and rolled. The road laid down from this mix had about 4% voids, or minute air pockets. The percentage of voids was determined according to the A. S. T. M. test C30–37 which consists in calculating a theoretical specific gravity and determining the variation from this quantity which corresponds to voids. Experience has shown that 4% voids is about optimum. The blown cells thus did not carry over into the final paving mix, being collapsed by the aggregate. Examination of the roadbed showed an even distribution of the rubber which is characteristic of a well laid rubberized road.

*Example II*

One thousand fifty pounds (126 gallons) of 85 to 100 penetration asphalt binder was charged into a tank and heated to 300° F. One hundred and fifty pounds of the pellets prepared as in Example I were added and the mass agitated for about three hours. During this time, the pellets were suspended and gradually dissolved in the asphalt. There was no agglomeration of the rubber pellets on the bottom of the tank as occurs when the blowing agent is not used. The rubber-asphalt blend was suitable for addition to hot aggregate in the pug mill, or for spraying on rolled dry aggregate in the penetration method of road building.

*Example III*

Pellets were prepared in the manner of Example I with the addition of materials to the Banbury in the following order according to the recipe: 100 parts of Paracril (copolymer of a major proportion of butadiene and a minor proportion of acrylonitrile), 20 parts of Dixie clay, 50 parts of coke oven tar pitch having a softening point of about 275° F. by the ring and ball test, 0.07 part of sodium bicarbonate, and 0.07 part of stearic acid.

Pellets made from the above composition readily dissolved in road tar binder in a hot mix made in a pug mill as in Example I by adding 1880 pounds of aggregate heated to 350° F., then adding 15 pounds of unheated pellets to the hot aggregate, and followed by the addition of 105 pounds of an RT–12 road tar heated to 250° F., to give an excellent paving.

*Example IV*

One hundred fifty pounds of pellets prepared as in Example III were agitated for six hours in a tank containing 1681 pounds of road tar (RT–12) heated to 250° F. The pellets remained suspended and gradually dissolved in the tar, and there was no agglomeration of pellets on the bottom of the tank as occurs when the blowing agent is not used. The rubber-tar blend was suitable for addition to hot aggregate in the pug mill, or for spraying on rolled dry aggregate in the penetration method of road building.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. Free-flowing comminuted particles of a thermoplastic composition adapted to be blended with the bituminous binder for the aggregate in paving construction comprising 20 to 60 parts of a rubber, 30 to 60 parts of a bituminous material having a softening point in the range from 200° F. to 350° F. as measured by the ring and ball test, and 0.01 to 0.5 part of a solid blowing agent, which decomposes at temperatures between 250° F. and 400° F., the individual comminuted particles having a volume equal to the volume of a cube from 1/32 inch to 1/2 inch on each side.

2. Free-flowing comminuted particles of a thermoplastic composition adapted to be blended with the bituminous binder for the aggregate in paving construction comprising 20 to 60 parts of a rubber, 30 to 60 parts of a bituminous material having a softening point in the range from 200° F. to 350° F. as measured by the ring and ball test, and 0.01 to 0.5 part of sodium bicarbonate, the individual comminuted particles having a volume equal to the volume of a cube from 1/32 inch to 1/2 inch on each side.

3. Free-flowing comminuted particles of a thermoplastic composition adapted to be blended with the bituminous binder for the aggregate in paving construction comprising 20 to 60 parts of a rubber selected from the group consisting of natural rubber, polybutadienes, synthetic rubber copolymers of mixtures of butadienes with up to 70% of the mixture of compounds which contain a $CH_2=C<$ group and are copolymerizable with butadienes, and synthetic rubber copolymers of a major proportion of an isoolefin and a minor proportion of a conjugated diene, 30 to 60 parts of bituminous material having a softening point in the range from 200° F. to 350° F. as measured by the ring and ball test, selected from the group consisting of asphalt, gilsonite, tars and tar pitches, and 0.01 to 0.5 part of a solid blowing agent, which decomposes at temperatures between 250° F. and 400° F., the individual comminuted particles having a volume equal to the volume of a cube from 1/32 inch to 1/2 inch on each side.

4. Free-flowing comminuted particles of a thermoplastic composition adapted to be blended with the bituminous binder for the aggregate in paving construction comprising 20 to 60 parts of a rubber selected from the group consisting of natural rubber, polybutadienes, synthetic rubber, copolymers of mixtures of butadienes with up to 70% of the mixture of compounds which contain a $CH_2=C<$ group and are copolymerizable with butadienes, and synthetic rubber copolymers of a major proportion of an isoolefin and a minor proportion of a conjugated diene, 30 to 60 parts of bituminous material having a softening point in the range from 200° F. to 350° F. as measured by the ring and ball test, selected from the group consisting of asphalt, gilsonite, tars and tar pitches, and 0.01 to 0.5 part of sodium bicarbonate, the individual comminuted particles having a volume equal to the volume of a cube from 1/32 inch to 1/2 inch on each side.

5. Free-flowing comminuted particles of a thermoplastic composition adapted to be blended with the bituminous binder for the aggregate in paving construction comprising 20 to 60 parts of a synthetic rubber copolymer of a major proportion of isobutylene and a minor proportion of isoprene, 30 to 60 parts of bituminous material having a softening point in the range from 200° F. to 350° F. as measured by the ring and ball test, selected from the group consisting of asphalt, gilsonite, tar and pitch, and 0.01 to 0.5 part of a solid blowing agent which decomposes at temperatures between 250° F. and 400° F.

6. Free-blowing comminuted particles of a thermoplastic composition adapted to be blended with the bituminous binder for the aggregate in paving construction comprising 20 to 60 parts of a synthetic rubber copolymer of a major proportion of isobutylene and a minor proportion of isoprene, 30 to 60 parts of bituminous material having a softening point in the range from 200° F. to 350° F. as measured by the ring and ball test, selected from the group consisting of asphalt, gilsonite, tars and tar pitches, and 0.01 to 0.5 part of sodium bicarbonate, the individual comminuted particles having a volume equal to the volume of a cube from 1/32 inch to 1/2 inch on each side.

7. Free-flowing comminuted particles of a thermoplastic composition adapted to be blended with the bituminous binder for the aggregate in paving construction comprising 20 to 60 parts of a synthetic rubber copolymer of a major proportion of isobutylene and a minor proportion of isoprene, 30 to 60 parts of a mixture of gilsonite and an asphalt having a softening point in the range from 200° F. and 350° F. as measured by the ring and ball test, and 0.01 to 0.5 part of a solid blowing agent which decomposes at temperatures between 250° F. and 400° F., the individual comminuted particles having a volume equal to the volume of a cube from 1/32 inch to 1/2 inch on each side.

8. Free-flowing comminuted particles of a thermoplastic composition adapted to be blended with the bituminous binder for the aggregate in paving construction comprising 20 to 60 parts of a synthetic rubber copolymer of a major proportion of isobutylene and a minor proportion of isoprene, 30 to 60 parts of a mixture of gilsonite and an asphalt having a softening point in the range from 200° F. and 350° F. as measured by the ring and ball test, and 0.01 to 0.5 part of sodium bicarbonate, the individual comminuted particles having a volume equal to the volume of a cube from 1/32 inch to 1/2 inch on each side.

9. Free-flowing comminuted particles of a thermoplastic composition adapted to be blended with the bituminous binder for the aggregate in paving construction comprising 20 to 60 parts of a synthetic rubber copolymer of a major proportion of butadiene and a minor proportion of acrylonitrile, 30 to 60 parts of a bituminous pitch having a softening point in the range from 200° F. and 350° F. as measured by the ring and ball test, and 0.01 to 0.5 part of a solid blowing agent which decomposes at temperatures between 250° F. and 400° F. the individual comminuted particles having a volume equal to the volume of a cube from 1/32 inch to 1/2 inch on each side.

10. Free-flowing comminuted particles of a thermoplastic composition adapted to be blended with the bituminous binder for the aggregate in paving construction comprising 20 to 60 parts of a synthetic rubber copolymer of a major proportion of butadiene and a minor proportion of acrylonitrile, 30 to 60 parts of a bituminous pitch having a softening point in the range from 200° F. and 350° F. as measured by the ring and ball test, and 0.01 to 0.5 part of sodium bicarbonate, the individual comminuted particles having a volume equal to the volume of a cube from 1/32 inch to 1/2 inch on each side.

11. The method of building paving construction which comprises applying to the aggregate for the paving construction a bituminous binder selected from the group consisting of asphalt and road tar heated to 250° F. to 400° F. and blended with free-flowing comminuted particles of a thermoplastic composition comprising 20 to 60 parts of a rubber, 30 to 60 parts of a bituminous material having a softening point in the range from 200 F. to 350° F. as measured by the ring and ball test, and 0.01 to 0.5 part of a solid blowing agent which decomposes at temperatures between 250° F. and 400° F., said comminuted particles being in amount to give 1% to 15% of rubber based on the bituminous binder.

12. The method of building paving construction which comprises mixing at temperature from 250° F. to 400° F. aggregate for the paving construction, a bituminous binder selected from the group consisting of asphalt and road tar, and free-flowing comminuted particles of a thermoplastic composition comprising 20 to 60 parts of a rubber, 30 to 60 parts of a bituminous material having a softening point in the range from 200° F. to 350° F. as measured by the ring and ball test, and 0.01 to 0.5 part of sodium bicarbonate, said comminuted particles being in amount to give 1% to 15% of rubber based on the bituminous binder.

13. The method of building paving construction which comprises mixing at temperature from 250° F. to 400° F. aggregate for the paving construction, a bituminous binder selected from the group consisting of asphalt and road tar, and free-flowing comminuted particles of a thermoplastic composition comprising 20 to 60 parts of a rubber selected from the group consisting of natural rubber, polybutadienes, synthetic rubber copolymers of mixtures of butadienes with up to 70% of the mixture of compounds which contain a

group and are copolymerizable with butadienes, and synthetic rubber copolymers of a major proportion of an isoolefin and a minor proportion of a conjugated diene, 30 to 60 parts of bituminous material having a softening point in the range from 200° F. to 350° F. as measured by the ring and ball test, selected from the group consisting of asphalt, gilsonite, tars and tar pitches, and 0.01 to 0.5 part of a solid blowing agent which decomposes at temperatures between 250° F. and 400° F., said comminuted particles being in amount to give 1% to 15% of rubber based on the bituminous binder.

14. The method of building paving construction which comprises applying to the aggregate for the paving construction a bituminous binder selected from the group consisting of asphalt and road tar heated to 250° F. to 400° F. and blended with free-flowing comminuted particles of a thermoplastic composition comprising 20 to 60 parts of a rubber selected from the group consisting of natural rubber, polybutadienes, synthetic rubber copolymers of mixtures of butadienes with up to 70% of the mixture of compounds which contain a

group and are copolymerizable with butadienes, and synthetic rubber copolymers of a major proportion of an isoolefin and a minor proportion of a conjugated diene, 30 to 60 parts of bituminous material having a softening point in the range from 200° F. to 350° F. as measured by the ring and ball test, selected from the group consisting of asphalt, gilsonite, tar and pitch, and 0.01 to 0.5 part of sodium bicarbonate, said comminuted particles being in amount to give 1% to 15% of rubber based on the bituminous binder.

15. The method of building paving construction which comprises applying to the aggregate for the paving construction a bituminous binder selected from the group consisting of asphalt and road tar heated to 250° F. to 400° F. and blended with free-flowing comminuted particles of a synthetic rubber copolymer of a major proportion of isobutylene and a minor proportion of isoprene, 30 to 60 parts of bituminous material having a softening point in the range from 200° F. to 350° F. as measured by the ring and ball test, selected from the group consisting of asphalt, gilsonite, tar and pitch, and 0.01 to 0.5 part of a solid blowing agent which decomposes at temperatures between 250° F. and 400° F., said comminuted particles being in amount to give 1% to 15% of rubber based on the bituminous binder.

16. The method of building paving construction which comprises mixing at temperature from 250° F. to 400° F. aggregate for the paving construction, a bituminous binder selected from the group consisting of asphalt and road tar, and free-flowing comminuted particles of a thermoplastic composition comprising 20 to 60 parts of a synthetic rubber copolymer of a major proportion of isobutylene and a minor proportion of isoprene, 30 to 60 parts of bituminous material having a softening point in the range from 200° F. to 350° F. as measured by the ring and ball test, selected from the group consisting of asphalt, gilsonite, tar and pitch, and 0.01 to 0.5 part of sodium bicarbonate, said comminuted particles being in amount to give 1% to 15% of rubber based on the bituminous binder.

17. The method of building paving construction which comprises mixing in a pug mill at temperature from 250° F. to 400° F. aggregate for the paving construction, a bituminous binder selected from the group consisting of asphalt and road tar, and free-flowing comminuted particles of a thermoplastic composition comprising 20 to 60 parts of a synthetic rubber copolymer of a major proportion of isobutylene and a minor proportion of isoprene, 30 to 60 parts of a mixture of gilsonite and an asphalt having a softening point in the range from 200° F. to 350° F. as measured by the ring and ball test, and 0.01 to 0.05 part of a solid blowing agent which decomposes at temperatures between 250° F. and 400° F., said comminuted particles being in amount to give 1% to 15% of said synthetic rubber based on the asphalt binder.

18. The method of building paving construction which comprises applying to the aggregate for the paving construction a bituminous binder selected from the group consisting of asphalt and road tar heated to 250° F. to 400° F. and blended with free-flowing comminuted particles of a thermoplastic composition comprising 20 to 60 parts of a synthetic rubber copolymer of a major proportion of isobutylene and a minor proportion of isoprene, 30 to 60 parts of a mixture of gilsonite and an asphalt having a softening point in the range from 200° F. to 350° F. as measured by the ring and ball test, and 0.01 to 0.5 part of sodium bicarbonate, said comminuted particles being in amount to give 1% to 15% of said synthetic rubber based on the asphalt binder.

19. The method of building paving construction which comprises applying to the aggregate for the paving construction a bituminous binder selected from the group consisting of asphalt and road tar heated to 250° F. to 400° F. and blended with free-flowing comminuted particles of a thermoplastic composition comprising 20 to 60 parts of a synthetic rubber copolymer of a major proportion of butadiene and a minor proportion of acrylonitrile, 30 to 60 parts of a bituminous pitch having a softening point in the range from 200° F. to 350° F. as measured by the ring and ball test, and 0.01 to 0.5 part of a solid blowing agent which decomposes at temperatures between 250° F. and 400° F., said comminuted particles being in amount to give 1% to 15% of rubber based on the road-tar binder.

20. The method of building paving construction which comprises mixing in a pug mill at temperature from 250° to 400° F. aggregate for the paving construction, a bituminous binder selected from the group consisting of asphalt and road tar, and free-flowing comminuted particles of a thermoplastic composition comprising 20 to 60 parts of a synthetic rubber copolymer of a major proportion of butadiene and a minor proportion of acrylonitrile, 30 to 60 parts of a bituminous pitch having a softening point in the range from 200° F. to 350° F. as measured by the ring and ball test, and 0.01 to 0.5 part of sodium bicarbonate, said comminuted particles being in amount to give 1% to 15% of rubber based on the road-tar binder.

References Cited in the file of this patent
UNITED STATES PATENTS 1,371,016     Bennett et al.  ----------- Mar. 8, 1921
1,828,365     Geyer et al.  ------------ Oct. 20, 1931